Aug. 8, 1939. C. IVERSON 2,169,146
VULCANIZING MOLD AND OTHER PRESSES
Filed April 20, 1937 12 Sheets-Sheet 3

Inventor
Cato Iverson
By Ralph Barrow
Attorney

Aug. 8, 1939. C. IVERSON 2,169,146
VULCANIZING MOLD AND OTHER PRESSES
Filed April 20, 1937 12 Sheets-Sheet 4

Inventor
Cato Iverson
By Ralph Barrow,
Attorney

Aug. 8, 1939. C. IVERSON 2,169,146
VULCANIZING MOLD AND OTHER PRESSES
Filed April 20, 1937 12 Sheets-Sheet 5

Inventor
Cato Iverson
By Ralph Barrow
Attorney

Aug. 8, 1939. C. IVERSON 2,169,146
VULCANIZING MOLD AND OTHER PRESSES
Filed April 20, 1937 12 Sheets—Sheet 6

Inventor
Cato Iverson
By Ralph Barrow
Attorney

Aug. 8, 1939.   C. IVERSON   2,169,146
VULCANIZING MOLD AND OTHER PRESSES
Filed April 20, 1937   12 Sheets-Sheet 7

Inventor
Cato Iverson
By Ralph Barrow
Attorney

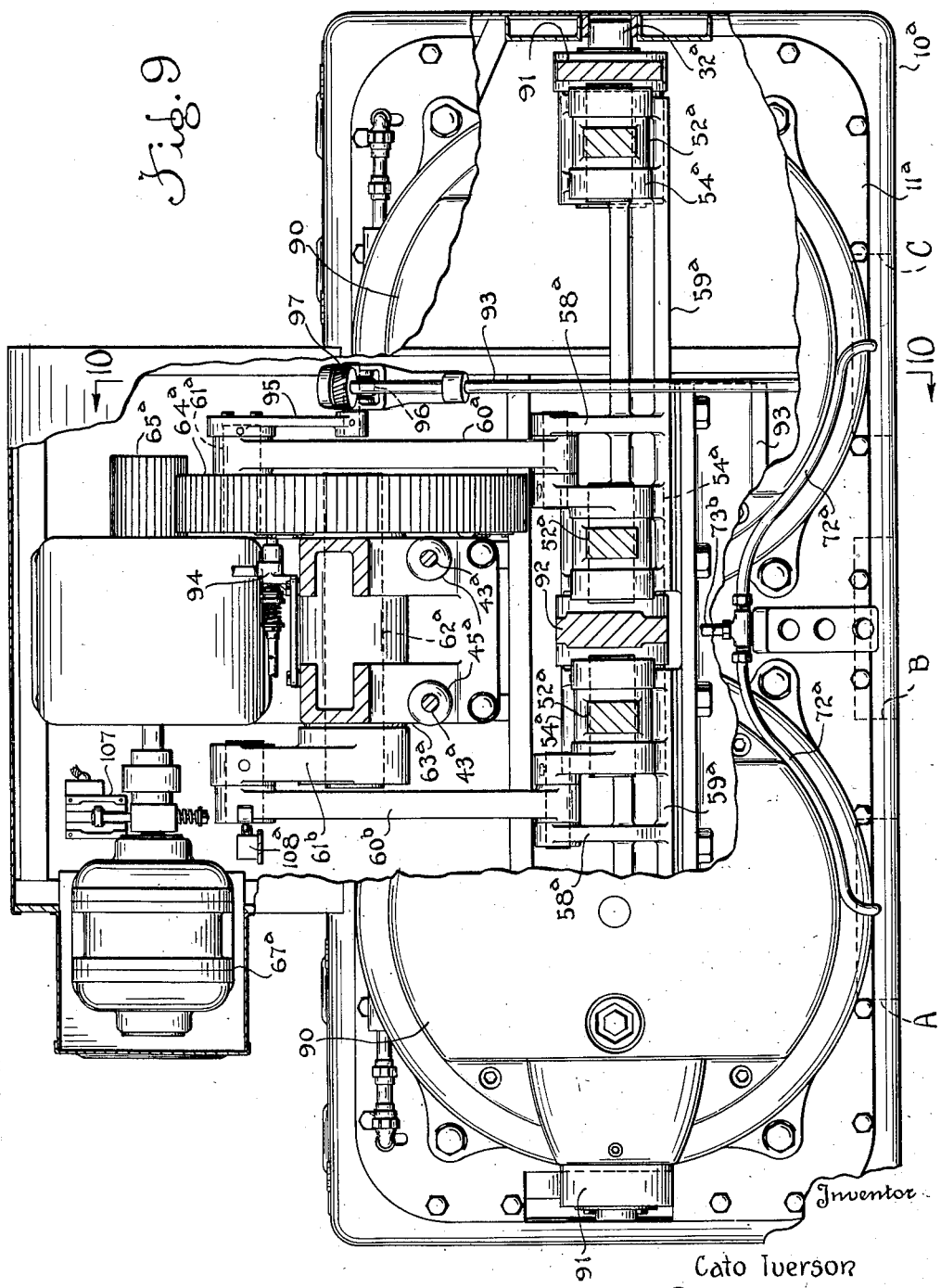

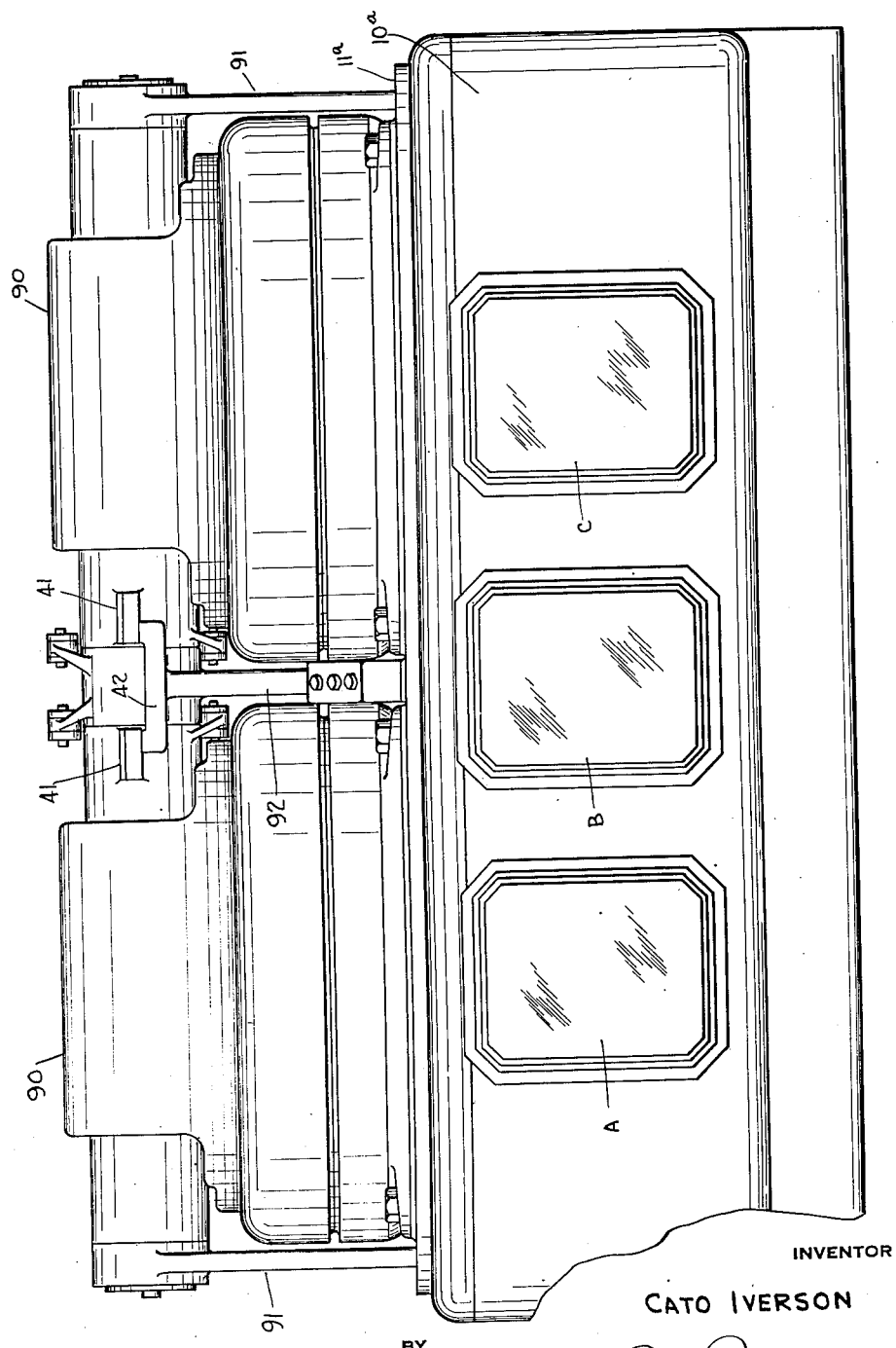

Aug. 8, 1939.   C. IVERSON   2,169,146
VULCANIZING MOLD AND OTHER PRESSES
Filed April 20, 1937   12 Sheets-Sheet 10
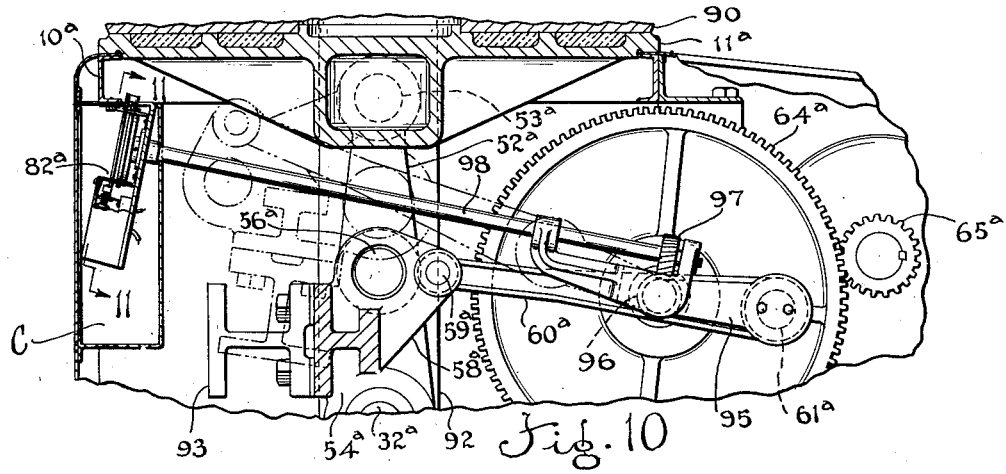
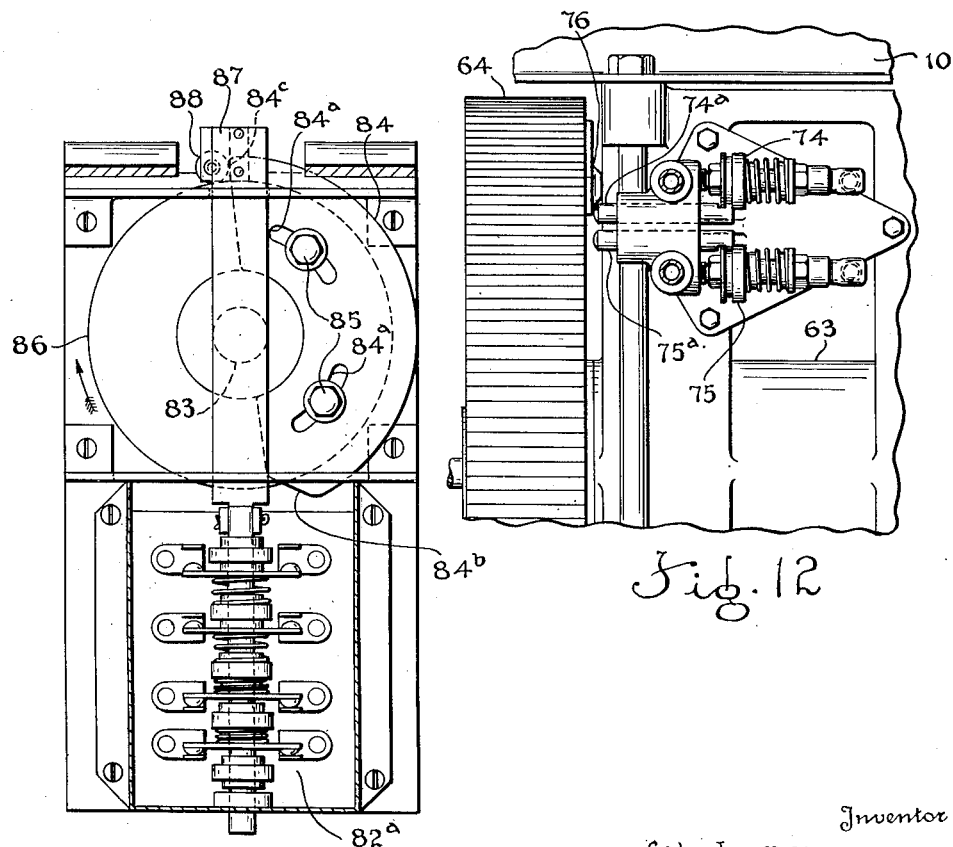
Inventor
Cato Iverson
By J. Ralph Barrow,
Attorney

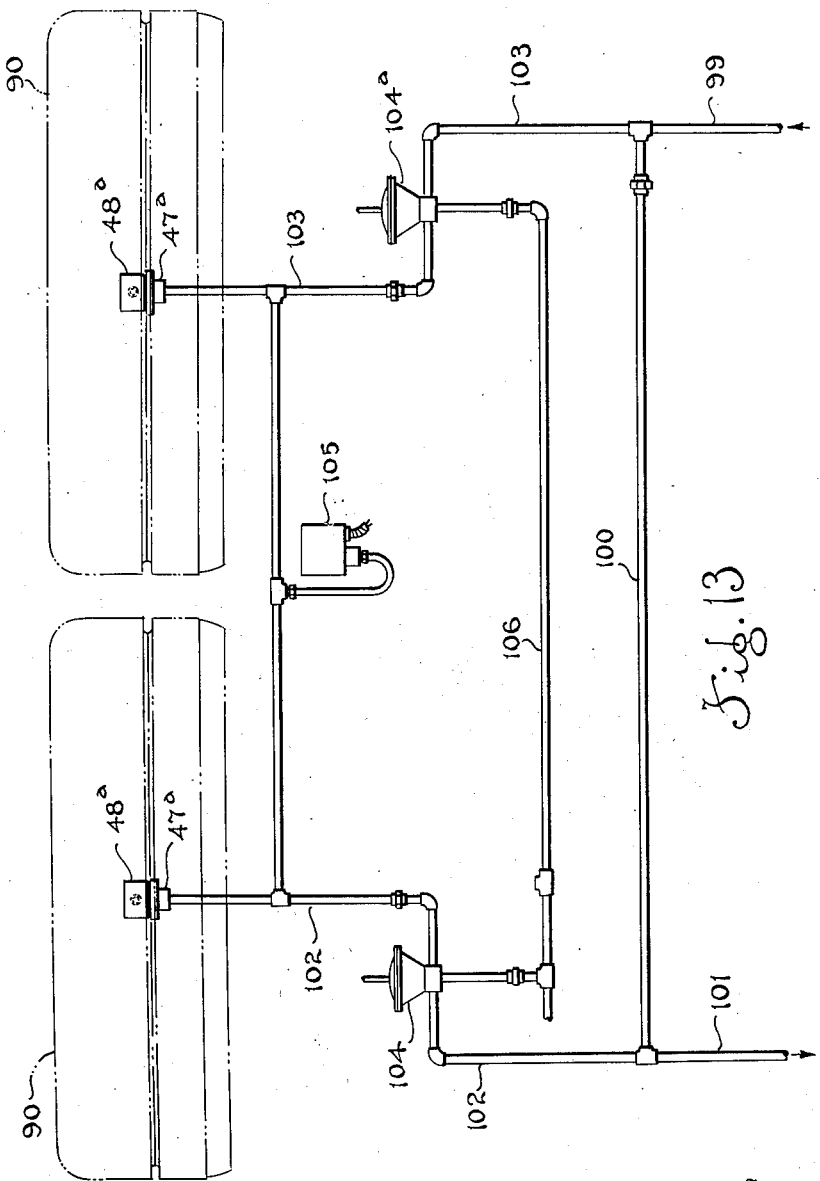

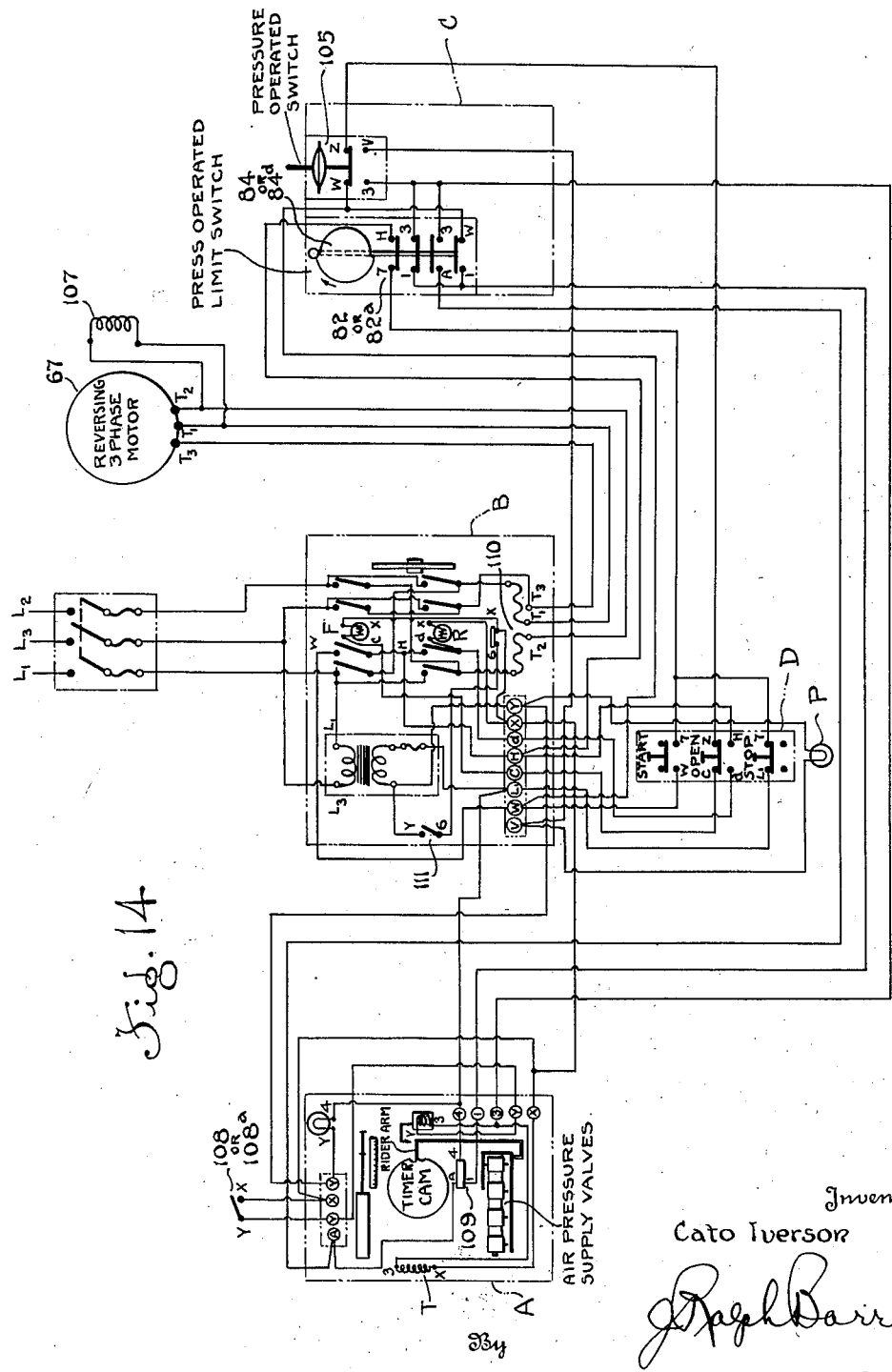

Patented Aug. 8, 1939

2,169,146

UNITED STATES PATENT OFFICE 2,169,146

VULCANIZING MOLD AND OTHER PRESSES

Cato Iverson, Akron, Ohio, assignor to National Rubber Machinery Company, Akron, Ohio, a corporation of Ohio Application April 20, 1937, Serial No. 137,947

11 Claims. (Cl. 18—17)

This invention relates to vulcanizing mold and other presses.

The general purpose of the invention is to provide a simple, compact, powerful press unit for use in vulcanizing tires, inner tubes, and other rubber articles and for general use.

A further purpose of the invention is to provide an improved platen-operating mechanism for presses of simple, compact, but powerful construction and particularly to provide a press with movable platen and simple effective and compact means for moving the platen.

A further purpose of the invention is to provide simple effective means for causing the movable platen to operate to and from registry, with the press platens substantially parallel and for causing the movable platen to tilt from and toward said parallel position when the press is operated toward and from a fully open position.

A further purpose of the invention is to provide a press of the type described and a prime mover for operating the same with a simple effective connecting mechanism between the prime mover and the press.

A further object of the invention is to provide an improved duplex press.

A further object of the invention is to provide a duplex press and a single prime mover with means for operating the press from such single prime mover.

A further object of the invention is to provide improved means for relatively adjusting the platens.

A further purpose of the invention is to provide in such presses for forming articles improved means for stripping and removing the finished articles from the mold parts carried by the platens.

The foregoing and other purposes and objects of the invention are attained in the presses illustrated in the accompanying drawings and described below. It is to be understood that the invention is not limited to the specific form thereof shown and described.

Of the accompanying drawings:

Figure 9 is an upper plan partly in section of a duplex press embodying the invention.

Figure 9a is a front elevation of Figure 9.

Figure 10 is a section on line 10—10 of Figure 9.

Figure 11 is a section on line 11—11 of Figure 10.

Figure 12 is a detail elevation of the stripper control valves and operating means therefor.

Figure 13 is a piping diagram for the duplex press showing the supply and control means for the pressure fluid introduced into the usual curing bags in the tire molds, and Figure 14 is a wiring diagram for the press.

Figure 1:
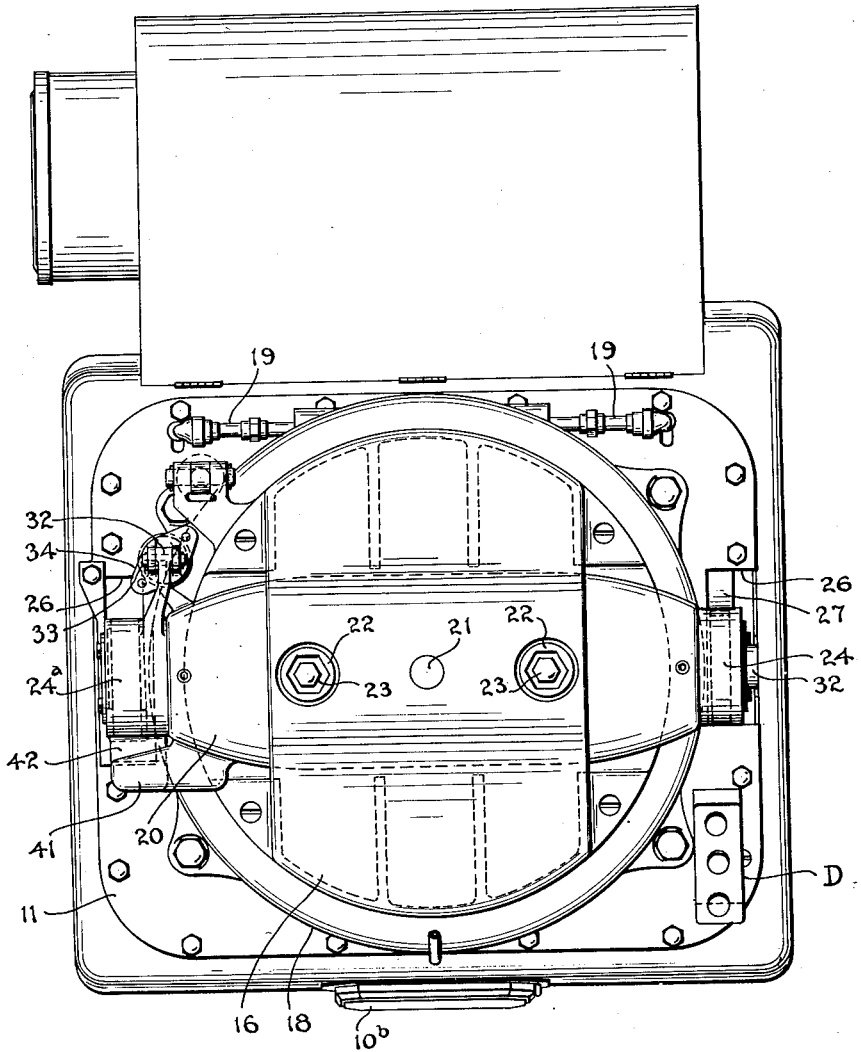
Figure 1 is a top plan view of a closed tire-vulcanizing press embodying the invention.

Referring to the drawings, the numeral 10 designates a suitable base frame which may be housed as shown and on top of which may be secured a lower platen 11. The platen 11 may have insulating material thereon at 12 and on this platen may be mounted the lower annular section 13 of a tire mold, said section being chambered as at 14 to receive steam or other fluid for heating from suitable supply pipes as indicated at 15.

Figure 2:
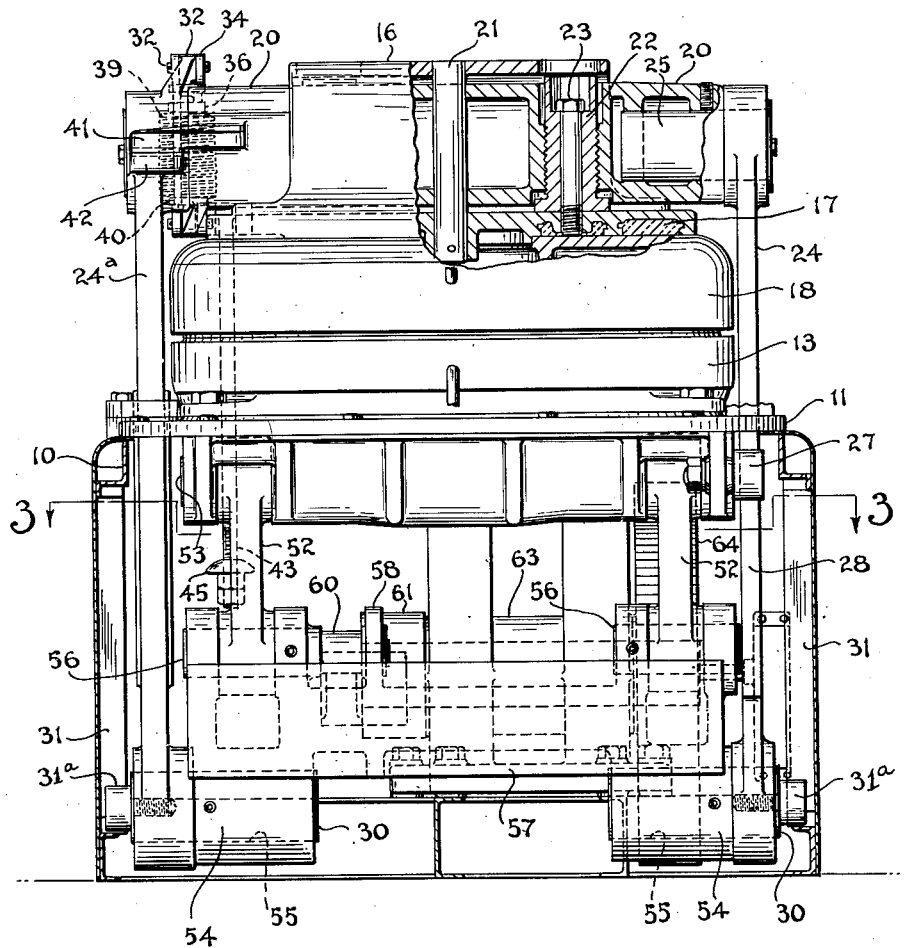
Figure 2 is a front elevation thereof, partly broken away and partly in section on line 2—2 of Figure 4.
Figure 4:
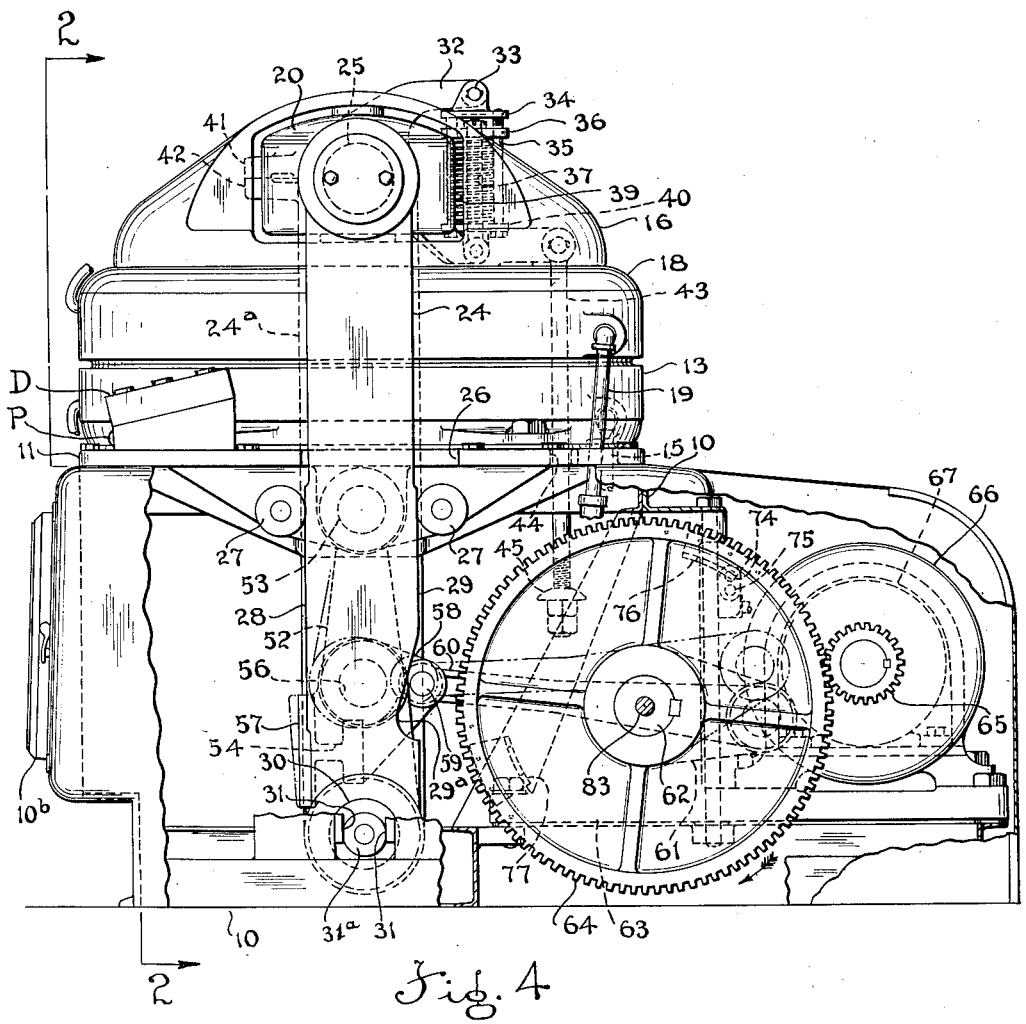
Figure 4 is a side elevation thereof with the housing for the operating mechanism partly broken away and in section.

Above platen 11 there is provided a movable platen 16 insulated if required on its under face at 17 and to said under face there is secured a mold section 18 similar to section 13 and adapted to register therewith when the press is closed as shown in Figures 1, 2 and 4. Steam for heating may be supplied to section 18 by flexible piping indicated at 19 as will be understood in the art.

The upper platen 16 is adjustably supported on press head 20 as best shown in Figures 1 and 2 by means of a pin 21 secured to the platen and vertically slidable through press-head 20 and by means of adjustable platen supports 22 threaded through press head 20 and formed at the tops thereof, as shown, whereby they may be adjusted by a suitable wrench (not shown) bolts such as indicated at 23, 23 being extended through supports 22 and threaded into platen 16 to draw the platen up against the lower faces of the supports 22 (see Figure 2). This form of adjustment is especially desirable in heating and vulcanizing presses in that the adjustment does not disturb the insulated mounting of a heating mold such as 17 on the platen 16.

The press head 20 is carried by side arms 24 and 24ᵃ to which the press head is pivoted at 25, 25. These side arms 24 and 24ᵃ pass down through openings in the top of base 10 through which the side arms are guided and arm 24 passes through an opening 26 in the top of base 10 between rollers 27, 27 journaled in brackets under the lower platen 11 which rollers contact edge faces 28 and 29 of the side arm 24. At their lower ends side arms 24 and 24ᵃ are pivoted on pintles 30 and 30ᵃ, respectively, which are arranged to slide along vertical guides 31, 31 on the insides of frame 10 by means of rollers 31ᵃ, 31ᵃ journaled in pintles 30 and 30ᵃ and extending between the sides of guides 31.

The press head 20 is normally retained in a position to support the upper platen parallel to the lower platen on the tops of the arms 24 and 24ᵃ by means of an arm 32 on the top of one side arm 24ᵃ and pivotally connected at 33 to a yoke 34 having spaced rods 35, 35 thereon. On these rods 35 there is provided a slidable plate 36 connected by a link 37 to press head 20, a compression spring 39 being arranged between a plate 40 on yoke 34 and the slidable plate 36 whereby the spring will normally urge the platen counterclockwise on the arms 24 and 24ᵃ, a lug 41 on the press head 20 engaging a lug 42 on the side arm 24ᵃ to retain the platen 16 in a position parallel to the lower platen 11 when the arms 24 and 24ᵃ are extending vertically of the lower platen. The upper platen 16 is arranged to be tilted on the side arms 24 and 24ᵃ as shown in Figure 6 by means of a link 43 slidable freely through an aperture 44 as the platens move toward and from registry between a closed condition and a semi-open position of the press (see Figures 4 and 5) the link 43 having on its lower end a stop 45 for engaging under flange of the platen 11 to prevent further upward movement of link 43 above the position thereof shown in Figure 5 but permitting pivotal action of the link whereby further upward movement of arms 24 and 24ᵃ will cause the platen to tilt on the arms 24 and 24ᵃ as shown in Figure 6 against the restraining influence of spring 39.

Figure 6:
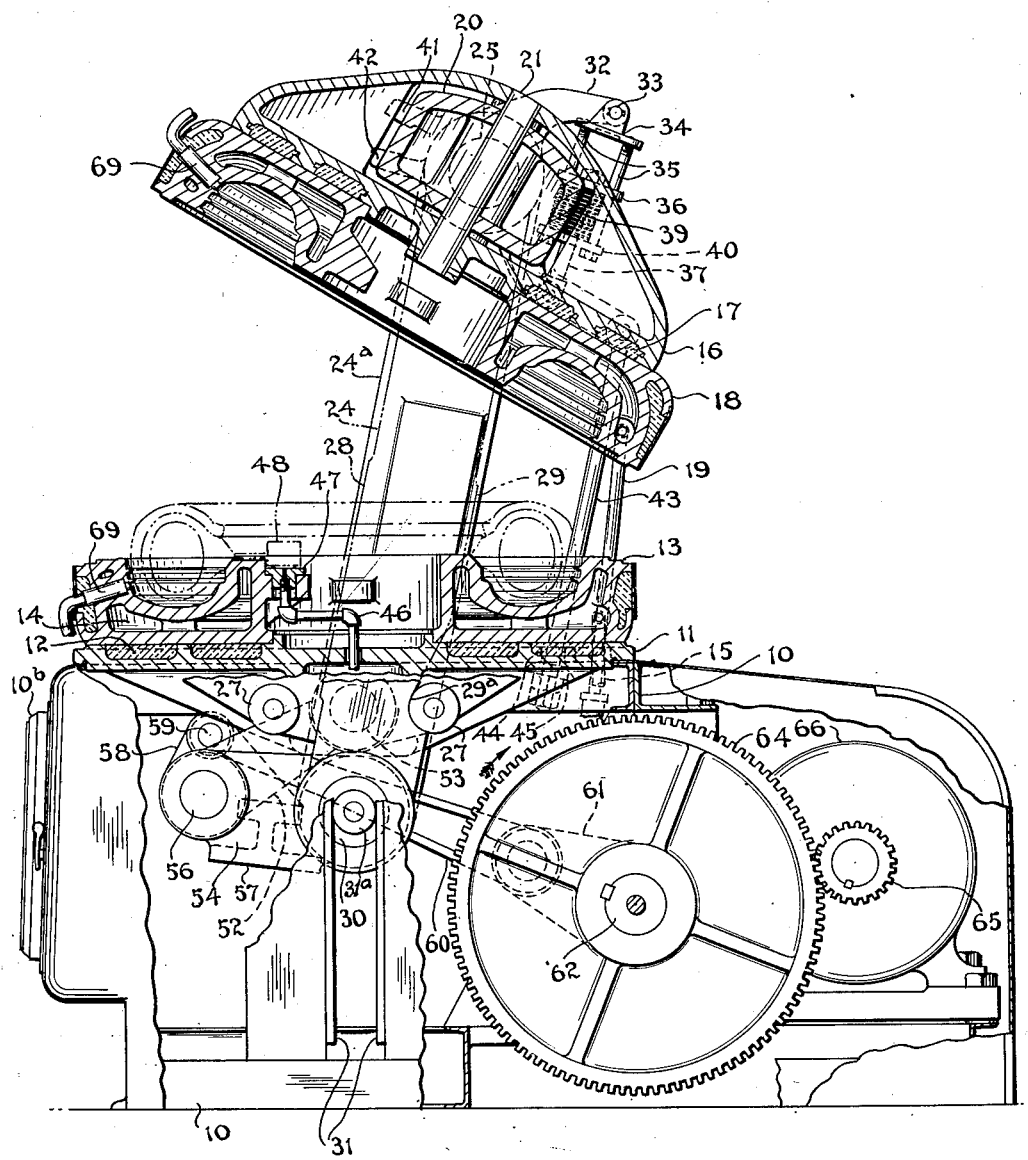
Figure 6 is a similar view with the press shown fully open.

In order to permit the press to be opened wide as shown in Figure 6, to facilitate insertion and removal of tires, cleaning and treating the mold surfaces, etc., the side face 29 of the arm 24 may be relieved as indicated at 29ᵃ permitting arms 24 and 24ᵃ to swing upon members 30 rearwardly of the press.

A piping connection may be provided as at 46 for supplying an expanding or curing fluid to an article being vulcanized in the press, and in the specific embodiment of the invention shown this may be extended to a joint member at 47 on the lower mold section 13 engageable with a joint member 48 connected to a nipple 49 on an annular pressure bag 50 used in the tire 51 during the cure, this being a known type of connection.

Figure 5:
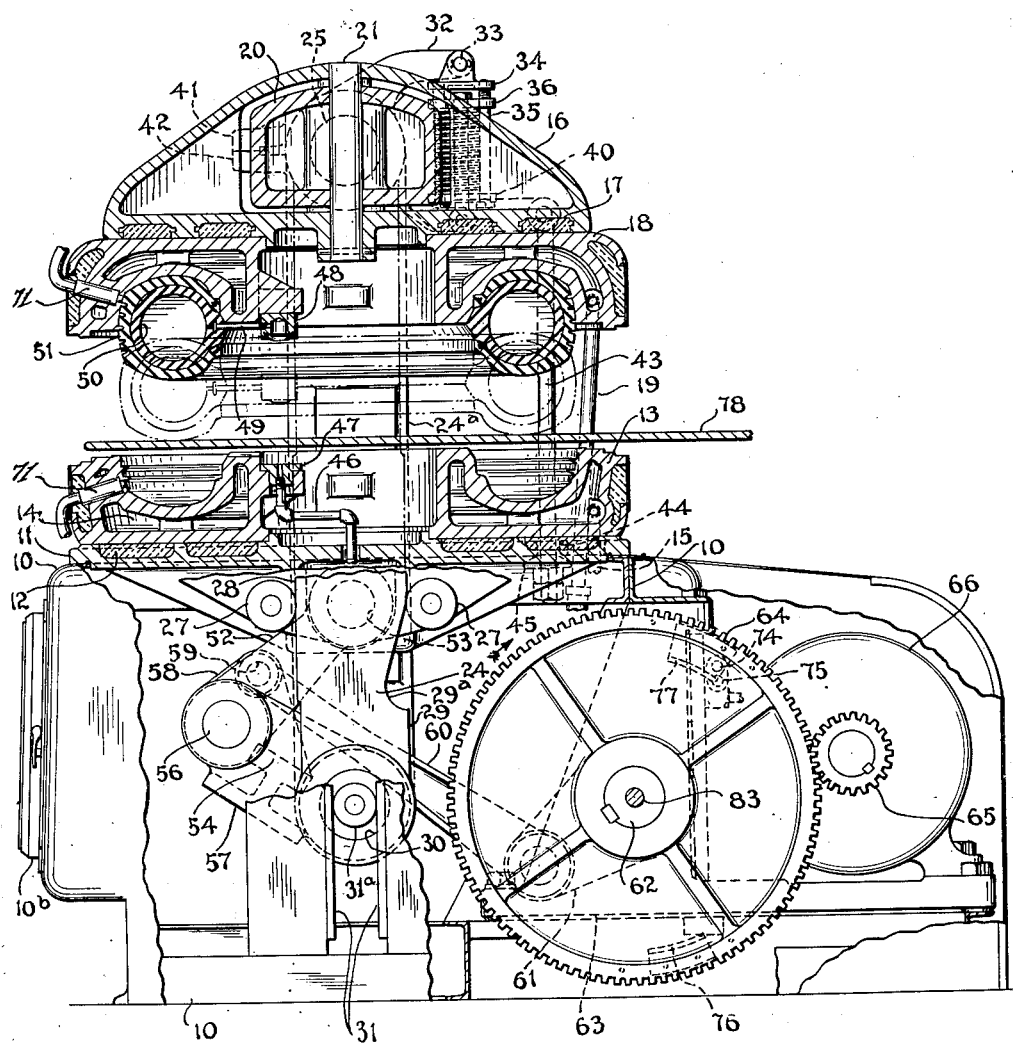
Figure 5 is a similar view with the press shown in a partly open position and the platens and molds in diametrical section.

A toggle mechanism may be used for operating arms 24 and 24ᵃ, and in accordance with the present invention this toggle mechanism is of a simple, compact construction with a short powerful stroke providing a comparatively low, space-economizing press with all parts readily accessible for maintenance but, nevertheless, permitting full opening of the press to facilitate insertion and removal of the work and mold cleaning and treating, etc. To these ends the toggle mechanism comprises a pair of upper links 52, 52 pivotally mounted on the under side of platen 11 at 53, 53 and a pair of lower links 54, 54 connected to pintles 30 at 55, 55, the knuckles of the toggles being at 56, 56. The lower links are spanned by a crossbar 57, secured to or integral therewith whereby the pairs of toggles and the connected arms 24 and 24ᵃ operate in unison. On the cross-bar 57 there is provided a bifurcated arm 58 to which is pivotally connected at 59 eccentrically of the knuckles 56, a pitman 60. The arm 58 and pivot 59 are so arranged that as the toggle is straightened or extended by the pitman 60 to draw arms 24 and 24ᵃ downwardly to close the press, the pull upon the toggles through the arm 58 becomes more and more directly in line with the toggle knuckle 56 to provide a powerful press closing force, but as the toggles are collapsed by the pitman 60, as shown in Figure 5, to open the press, a moment of force of the pitman measured by the distance between pivots 59 and 56 and by the direction the pitman is applying that force causes the lower toggle links to be swung upwardly or in a counterclockwise direction (Figure 5) so as to apply a collapsing force to the toggle in such a way as to relieve heavy friction of the lower ends of the toggle upon guides 31 thus enabling comparatively short, compact, powerful toggles to be used and obtaining a full collapse thereof as shown in Figure 6 to obtain a full opening of the press for the purposes set forth.

Pitman 60 is preferably operable by a crank 61 so connected as shown in Figure 4 as to apply its most powerful force in line with the knuckle 56 as the press is closed and to apply its opening force in the most effective direction to secure the most effective moment of force on the lower toggle links 54 at the opening of the press so as to obtain maximum toggle collapse and thereby a maximum opening of the press. A limit switch 108, operable by the end of pitman 60 as it swings downwardly to press-closed position, may be provided at the rear of the press. The purpose of switch 108 will be explained later in connection with the wiring diagram description.

Crank 61 may be secured upon a shaft 62 journaled in a bearing 63 in frame 10 and driven by a gear 64 meshed with a gear 65 driven through a suitable reduction 66 from a reversing type motor 67. By the construction of press shown, it is possible to mount the motor in a fixed position on a firm foundation, eliminating many maintenance difficulties encountered in prior tire-vulcanizing presses.

Figures 7, 8:
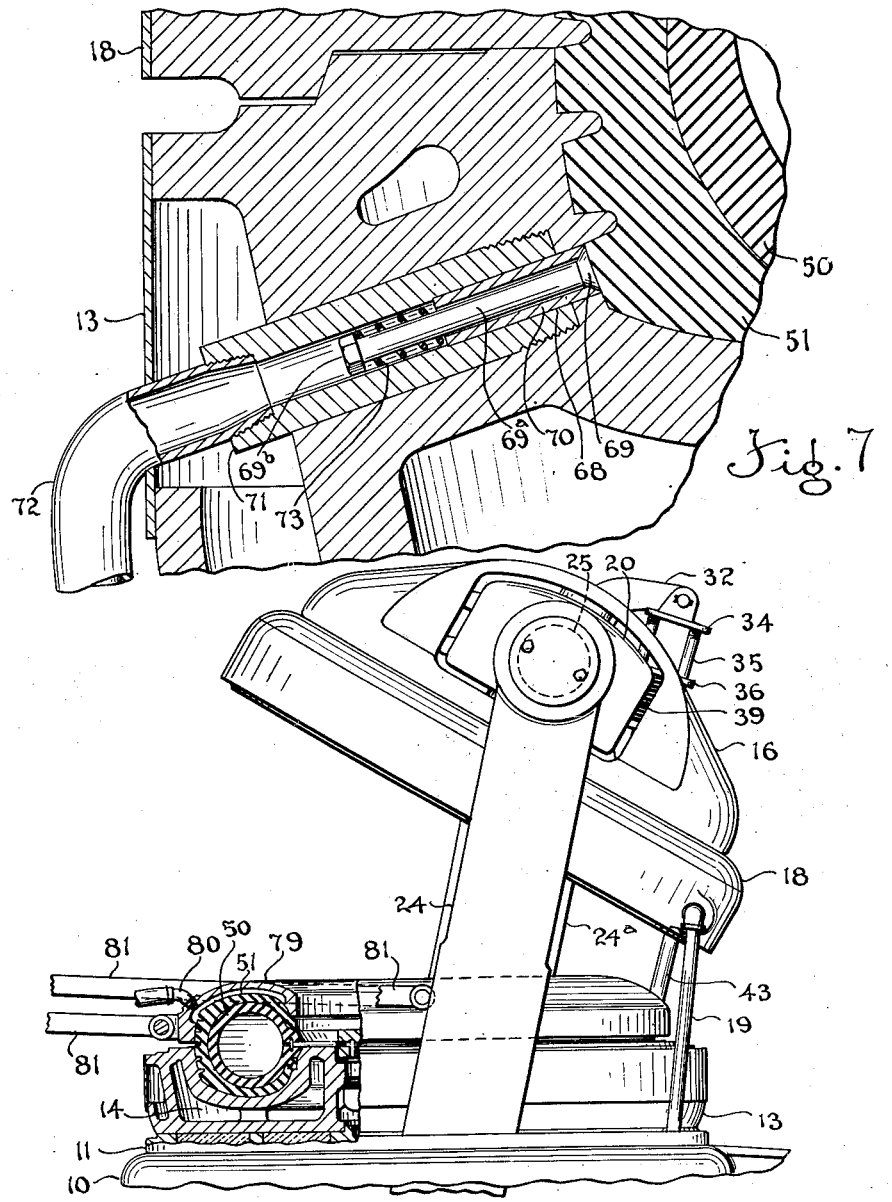
Figure 7 is an enlarged radial section at the mold stripping valve.
Figure 8 is an enlarged side-elevation partly in section of the upper part of the press shown open and with an associated means for stripping and removing a tire from the press.

There is incorporated in the tire-vulcanizing press shown, an improved means for stripping the tires from the molds. Heretofore, this has been done in molding presses by mechanical ejectors. In accordance with the present invention, each mold section 13 and 18 is formed with a bore 68 extending from the exterior thereof into the mold cavity (see Figure 7) through which air or the like under pressure may be forced between the vulcanized tire and the mold surface. This bore is preferably normally closed at its inner end by a valve 69, the inner face of which provides a molding surface at the bore and which normally seats upon a valve seat member 70 in the bore, member 70 being arranged in a valve casing 71 threaded into the mold and to which is connected an air-pressure supply line 72. The stem 69ᵃ of valve 69 is extended through seat member 70 and a spring 73 is arranged in the valve casing between a head 69$^b$ on valve stem 69$^a$ and the outer end of seat member 70 so as normally to hold valve 69 closed as shown and to permit this valve to open under pressure of air. The pressure supply lines 72 are controlled by normally closed valves 74 and 75 (see Figure 12) of a known construction, the operating members 74$^a$ and 75$^a$ of which are arranged to be engaged to be opened in timed relation with the opening of the press by cams 76 and 77, respectively, arranged upon the crank-operating gear 64. In accordance with the particular arrangement shown, valve 74 is engaged by cam 76 to force air into the mold section 13 just as the press starts to open (see Figure 4) and valve 75 is engaged by cam 77 to force air into mold section 18 when the mold sections are separated (see Figure 5) to first strip the tire from the lower mold section and thereafter to strip it from the upper mold section. The reverse sequence of stripping operations could be employed. With the arrangement shown an off-bearing tire support 78 (see Figure 5) may be inserted between the mold sections to receive the tire thereon (as indicated by chain-dotted lines) as it is stripped from the upper mold section, the tire dropping by gravity upon the support 78 which is then moved out of the press to remove the tire from the press. As shown in Figure 8, the tire may be first stripped by air or otherwise from the upper mold section, and removed from the lower section (with or without air-stripping) by use of a gripping device which may comprise an annular suction ring 79 with a suction attachment 80 and supporting links or levers 81, 81 whereby the ring may be inserted into the press and dropped onto a tire therein, suction gripping the tire, the ring thus being utilized to lift the tire out of the lower mold section. The ring may be oscillated or jiggled after in gripping relation on the tire as shown in order to aid in loosening the tire from the lower mold.

Figure 3:
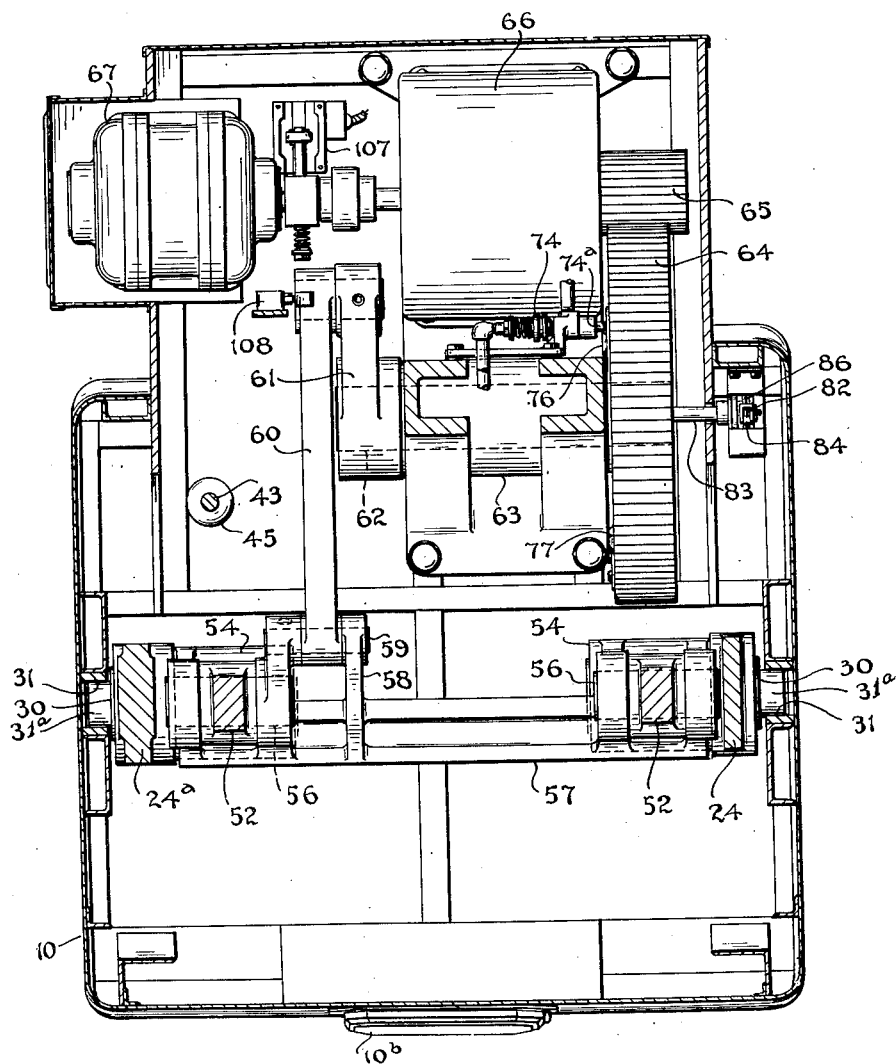
Figure 3 is a section on line 3—3 of Figure 2.

For controlling operation of the press shown in Figures 1 to 8 of the drawings, an opening and closing limit switch construction is provided, this being shown at 82 in Figure 3 on a shaft 83 rotating with gear 64. The detail of this switch is shown in Figure 11 and comprises a cam 84 adjustably mounted by bolts 85, 85 upon a disc 86 secured to shaft 83, the cam 84 having arcuate slots 84$^a$, 84$^a$ therein through which bolts 85 extend into disc 86 whereby the angular position of cam 84 is adjustable. Arranged to be operated by cam 84 is a switch-operating member 87 connected to switch 82 and having a roller 88 thereon for riding over the periphery of disc 86 and the periphery of cam 84. Cam 84 has a sloping portion 84$^b$ up which the roller 88 rides onto the periphery of the cam and roller 88 drops off the periphery of the cam at 84$^c$. When the roller 88 reaches a point about midway up the cam portion 84$^b$ the motor is stopped and the press is fully opened. When "start" button is pressed (Figure 14) roller 88 rides up cam portion 84$^b$ to the periphery of cam 84 establishing contact across 7—H (Figure 14) whereby the motor 67 will continue to operate to close the press after the "start" button is released, contacts 7—H being in series with coil F (Figure 14) which energizes the sticker switches shown associated therewith as hereinafter described. The drop off of cam 84$^c$ stops the motor when the press is fully closed. This will be understood with reference to the wiring diagram (Figure 14) later to be described.

A duplex press is illustrated in Figures 9, 9$a$ and 10. This is similar to the individual press previously described excepting as to the features which will now be described. There are, of course, two sets of platens, the upper of which are shown at 90, 90 and these are operable by outer side arms 91, 91 and a single intermediate arm 92 (effective as a side arm for each of the two platens). The arms 91 and 92 are operated by two pairs of toggles just like the single press. These are connected together to act in unison by means of a beam 93 bolted to the respective toggle, spanning members 57$^a$ corresponding to members 57 in the single or individual press. Gear 64$^a$ corresponding to gear 64 is directly connected by a crank pin 61$^a$ to the toggle mechanism of one of the duplex units through pitman 60$^a$ and drives a crank 61$^b$ through shaft 62$^a$, and crank 61$^b$ is connected by pitman 60$^b$ to the other press-operating toggle mechanism. The air-stripping control valves are arranged at 94 in association with gear 64$^a$ and air-stripping pressure-supply ducts 72$^a$, 72$^a$ for each set of molds are led to common supply-lines 72$^b$ extended to the control valves at 94 like in the individual press. The control switch 82$^a$ in this press is arranged in a control box C in the base frame 10$^a$ at the front thereof and in order to operate it from gear 64$^a$ an arm 95 is secured on crank-pin 61$^a$ to support a worm 96 concentric with gear 64$^a$. Worm 96 meshes with worm wheel 97 on a shaft 98 extended to switch 82$^a$ in control box C (see Figure 10).

As shown in Figure 13, the supply of fluid under pressure (usually hot water at 250 to 300 pounds per square inch and at 300° F.) to the curing bags in the duplex press is provided by pressure-supply circulating lines 99, 100, and 101 from which extend connecting lines 102 and 103 to the respective curing bags. Only one such connecting line is used, of course, for the individual press. On the connecting lines are valves 104 and 104$^a$ respectively which are controlled by the timer (later to be described) to supply fluid under pressure to the bags during the curing of tires in the press. As a safety means a connection is made from the pressure bag supply lines between the control valve or valves 104 and 104$^a$ and the curing bag to a pressure operated switch 105 of a known construction whereby this switch is held open by pressure in the curing bags until this pressure falls to a safe low value, preventing operation of the motor to open the press under unsafe conditions. This will be understood by reference to the wiring diagram in Figure 14 which will now be described. Valves 104 and 104$^a$ are adapted to connect the curing bags to drain line 106 after a cure has been completed.

Figure 14 shows a wiring diagram suitable for either the individual or duplex press. Generally speaking, it comprises a time control unit A, a motor control unit B and a press-operated control unit C, which are inter-connected with each other, with the press and the press-operating motor as will be described. Units A, B, and C in general are old in the art and will not require specific description other than to show how they are related to the press disclosed.

Press operated limit switch 82 or 82$^a$ is in unit C operated by cam 84 or 84$^d$. The pressure-operated safety switch 105 is also in unit C. A manual control switch unit is shown at D. This may be mounted on top of frame 10 for easy access of a press attendant. Unites A, B, and C, excepting limit switch 105 may be mounted in base frame 10 behind a door 10ᵇ therein and may be mounted in the front of base frame 10ᵃ of the duplex press as indicated in Figure 10.

It will suffice in the present case, without referring to wiring details to describe the operation of the press through the instrumentalities shown in the diagram, as follows:—

Referring to Figure 14, the operator, by pressing the "start" button on the manual control switch D, makes a press-closing circuit through pilot control circuits L₁—7 on the "stop" button, 7—W on the "start" button, W—Z on the pressure-operated switch 105, Z—C on the "open" button, C—X to energize coil F, X—6 on the overload relay 110, and 6—Y on the cut-out switch 111. Coil F is energized to maintain a press-closing circuit after the "start" button is released by operation of stickers shown associated with coil F for holding circuit H—W closed until the press is closed.

When the press is fully closed the press limit switch 82 or 82ᵃ opens circuit 7—H and sticker switch circuit H—W and closes circuits 1—W and A—3. At the same time the limit switch 108 or 108ᵃ at the rear of the press has been closed across Y—X by action of the pitman 60 or pitmans 60ᵃ and 60ᵇ. This limit switch is only closed when the press is closed. The timer switch 109 being initially closed across 4—A, energy is now supplied to the timer starting solenoid through circuit 3—Y, and to the timer motor T through circuit 3—X to begin the cure of the tire within the press.

At the end of the tire curing period the timer cam has rotated to a position which allows the rider arm to fall into the deepest notch in the cam to control the air supply valves and open circuit 4—A and close circuit b—1 on the limit switch 109. This de-energizes the timer motor T and timer starting solenoid circuit 3—Y and prepares the timer for resetting at starting position for the succeeding curing period. It also completes the press opening circuit through circuits 4—1, 1—W, W—Z, Z—C, C—X, X—6, and 6—Y, to open the press provided, however, that the pressure in the curing bag has been reduced to a safe low to allow the circuit W—Z on safty switch 105 to close. While the press is opening, circuit 1—3 on the press limit switch 82 or 82ᵃ is closed to reset the timer. When the press reaches the fully open position circuit 1—W on the same switch opens to de-energize the coil F and stop the motor 67.

The motor 67 may be reversed when the press is closing by pressing the "open" button, thereby closing a reversing circuit through circuits L₁—7 on the "stop" button, 7—H on switch 82 or 82ᵃ, H—d on the "open" button, D—X to energize reversing coil R, X—6 on the overload relay 110, and 6—Y on the cut-out switch 111. Energizing coil R reverses the motor 67 to bring the press back to open position, and at the same time it closes sticker-circuit H—D to maintain the reversing circuit until the press is fully open.

It should be noted that if there is over a predetermined amount of pressure in the curing bag while the press is closed the circuit 3—V on the pressure-operated switch 105 will be closed and the circuit W—Z will be open. Under this condition the press-operating circuit will be open and the press cannot be opened until the pressure in the bag goes down below the predetermined amount. When circuit 3—V is closed a pilot lamp P will be lit and remain so as long as the timer is running under normal curing conditions. When the timer stops, the lamp P will go out, thereby indicating the end of a curing period and that the press should open as soon as the bag pressure is reduced. This, of course, is an abnormal condition because normally the bag pressure will fall during the "blow-down" or draining period allowed for on the timer cam.

In order to stop the motor 67 quickly as the supply of power thereto is stopped when the press is opened or closed, a magnetic-brake 107 of a known construction may be used in association with the motor (see Figures 3, 9 and 14). The platens of the press are so adjusted that the molds are closed in registry before the toggles are fully extended by operation of the motor (as shown in chain-dotted lines in Figure 4) whereby subsequent full extension of the toggles sets up stresses in the side arms of the press to close and hold the mold closed under heavy pressure when the motor is stopped by limit switch 82 or 82ᵃ upon closing of the press.

The operation of the press mechanism itself will be readily understood from the foregoing description. Briefly, summarizing, it may be said that usually a battery of presses are used in a tire factory arranged to open after a cure in sequence so that an operator may move from one press to another, remove a finished tire and replace with an uncured tire which he places in the lower mold section 13. This sequence of operation depends upon the timer settings for the presses.

After an uncured tire is placed in an open press as indicated in Figure 6, the operator merely pushes the "start" or press-closing button on top of frame 10; this through the various instrumentalities shown in the wiring diagram starts the motor 67 and keeps it in operation until limit switch 82 or 82ᵃ stops the motor. The motor causes pitman 60 or pitmans 60ᵃ and 60ᵇ to operate the toggle mechanism of either type of press extending the toggles from the position thereof shown in Figure 6 to the full line position thereof shown in Figure 4. This draws side arms 24 and 24ᵃ, or side arms 91 and intermediate arm 92, downwardly whereby spring 39 causes upper platen 16 to swing to a position perpendicular to the arms wherein it is retained by engagement of lug 41 with lug 42 and at the same time relieved portion 29ᵃ of the side arm 24 engaging its guide roller 27 causes the side arms, and in the duplex press also the intermediate arm 92, to be swung to a vertical position. While this is being accomplished the pull of link 43 on the rear side of the upper platen 16 is relieved and the upper press platen 16 moves to a position parallel and axially of the lower platen 11. This position is shown in Figure 5.

Continued downward movement of the side arms under the influence of the toggles causes the upper platen 16 to move toward the lower platen 11 to bring mold sections 13 and 18 into registry as shown in Figure 4. During this movement the side arms 24 and 24ᵃ, or the side arms 91 and intermediate arm 92, are maintained in vertical positions by guide rollers 27 contacting the side edges 28 and 29 of the side arm 24. The lower ends of the side arms ride along the vertical guides 31 during the entire closing operation. From the semi-open position in Figure 5 to the closed position in Figure 4 the links 43 or 43ᵃ merely move downwardly freely and without effect through their openings 44 and the upper platen 16 is maintained in parallelism with the lower by the spring 39.

As the press is closed, the pressure connection to the curing bag is established at 48 or 48ª and the limit switch 82 or 82ª stops the motor 67 and switch 108 closes and starts the timer A.

The timer through pilot fluid pressure valves therein connects pilot fluid pressure to diaphragm valve or valves such as 104 and 104ª turning fluid under pressure (and curing temperature) into the curing or pressure bag. The molds themselves are continuously maintained at curing temperature by the steam circulated therethrough.

The timer A maintains this state or condition for any desired or required period (40 to 50 minutes) during which its cam or cams rotate. At the end of the cure the timer first causes operation of its pilot valves to cut off the supply of pressure fluid to the curing bag by operating the fluid pressure control valve or valves such as 104 and 104ª to disconnect the supply and connect the bag to drain. A short "blow-down" or drain interval follows whereupon the timer cam or cams causes the mold or press-opening switch 109 to close the press-opening circuit and causes the timer to stop and be reset for a succeeding curing operation. Normally this starts the motor 67 to open the press. This cannot take place, however, until switch 105 is closed which cannot occur unless pressure in the curing bag has fallen to a safe low during the interval between when this pressure is relieved by the timer and when timer closes the press-opening switch 109. When both switches 109 and 105 are closed regardless of the sequence of their closing (switch 105 normally closing first) then motor 67 is started to drive gear 64 or 64ª in the same direction as before, thereby causing the press to open.

On the opening of the press the pitman 60 or pitmans 60ª and 60ᵇ operate the toggle mechanisms from the condition shown in Figure 4 to the condition shown in Figure 6. The action of the pitman at the start (Figure 4) is directly in line with the toggle knuckles but as the toggles are collapsed the action becomes more and more eccentrically of the toggle knuckles on the arm 58 of the lower toggle links whereby a moment of force is established on the lower toggle links tending to swing them upwardly with minimum friction on guides 31 whereby the toggles may collapse more easily and more completely to permit full opening of the press with short compact and powerful toggles.

As the toggles collapse the side arms 24 and 24ª or side arms 91 and intermediate arm 92, are raised at first vertically, the upper platen 16 moving in parallel position away from the lower until it reaches the position shown in Figure 5. The side arms are maintained vertically of the press by guides 31 and guide rollers 27, 27 contacting edges 28 and 29 of the side arms.

During the initial stages of the opening movement, the cam 76 on gear 64 or 64ª engages valve 74 to admit air pressure to one mold section 13 through valve 69 to strip the tire from that section (the lower section first as shown in the drawings) and at the closing stages of the parallel movement as shown in Figure 5, or later if desired, the cam 77 on gear 64 or 64ª engages valve 75 to admit air under pressure through valve 69ª to the other mold section (the upper one as shown) to strip the finished tire from that section.

As the side arms 24 and 24ª or side arms 91 and intermediate arm 92, continue to move upwardly the stop 45 on link 43 or links 43ª, having engaged the under side of the flange on the platen 11 or 11ª, prevents further upward movement of the rear side of the upper mold platen 16 whereby the upper platen is caused to tilt upon arms 24 and 24ª, or arms 91 and intermediate arm 92, against the action of spring 39. The arms themselves may also be permitted to tilt or swing rearwardly by reason of relieved portion 29ª therein to carry the upper platen somewhat rearwardly of the lower to facilitate mold loading and unloading operations. When the press is fully opened limit switch 82 or 82ª causes the motor to stop ready for a press-closing operation by again pressing the "start" or mold-closing push button switch in unit D. The other control buttons in unit D are for manual control of opening or closing as may be necessary in an emergency.

Modifications of the invention may be resorted to without departing from the spirit thereof or the scope of the appended claims. While a tire press is shown, presses for tube-vulcanization or for other articles to be heated and molded or otherwise treated or formed therein may be provided which use features of the present invention.

What is claimed is:

1. A press of the class described, comprising relatively movable platens and means for moving one of said platens toward and from the other, said means comprising side arms pivotally connected to said platen, means on said side arms, normally holding said platen in a position substantially parallel with the other platen, means for operating said side arms to move said platen toward and from said other platen, and means for restraining movement of the rear side of said platen as it moves away from said other platen whereby said platen tilts on said arms against the action of said holding means out of parallelism with said other platen.

2. A press of the class described, comprising relatively movable platens and means for moving one of said platens toward and from the other, said means comprising a movable platen-supporting device upon which the platen is pivoted, means on said device for yieldingly holding said platen in a position parallel to said other platen, and means associated with the rear side of said platen to restrain movement thereof as the platen is moved away from said other platen whereby said platen tilts on said supporting device out of parallelism with said other platen against the action of said yielding means.

3. A press of the class described, comprising relatively movable platens and means for moving one of said platens toward and from the other, said means comprising side arms pivotally connected to said platen, yielding means on said side arms, normally holding said platen in a position substantially parallel with the other platen, means for operating said side arms to move said platen toward and from said other platen, and means for restraining movement of the rear side of said platen as it moves away from said other platen whereby said platen tilts on said arms against the action of said yielding means out of parallelism with said other platen, said side arms having guiding surfaces, and guiding means associated with said side arms so as to maintain said platen parallel with said other platen until said platen is tilted.

4. A press of the class described, comprising relatively movable platens and means for moving one of said platens toward and from the other, said means comprising a movable platen-supporting device upon which the platen is pivoted, means on said device for yieldingly holding said platen in a position parallel to said other platen, and means associated with the rear side of said platen to restrain movement thereof as the platen is moved away from said other platen whereby said platen tilts on said supporting device out of parallelism with said other platen against the action of said yielding means, said platen supporting device having guiding surfaces, and guiding means associated with said device so as to maintain said platen parallel with said other platen until said platen is tilted.

5. A press of the class described, comprising relatively movable platens and means for moving one of said platens toward and from the other, said means comprising side arms pivotally connected to said platen, yielding means on said side arms, normally holding said platen in a position substantially parallel with the other platen, means for operating said side arms to move said platen toward and from said other platen, and means for restraining movement of the rear side of said platen as it moves away from said other platen whereby said platen tilts on said arms against the action of said yielding means out of parallelism with said other platen, said side arms having guiding surfaces, and guiding means associated with said side arms so as to maintain said platen parallel with said other platen until said platen is tilted one side arm having a relieved portion on one of its guiding surfaces to permit rearward tilting of said arms when said platen is tilted.

6. A press of the class described, comprising relatively movable platens and means for moving one of said platens toward and from the other, said means comprising a movable platen-supporting device upon which the platen is pivoted, means on said device for yieldingly holding said platen in a position parallel to said other platen, and means associated with the rear side of said platen to restrain movement thereof as the platen is moved away from said other platen whereby said platen tilts on said supporting device out of parallelism with said other platen against the action of said yielding means, said platen supporting device having guiding surfaces, and guiding means associated with said device so as to maintain said platen parallel with said other platen until said platen is tilted, the supporting device having a relieved portion on one of its guiding surfaces to permit said device to tilt rearwardly when said platen is tilted.

7. A press of the class described, comprising relatively movable platens, and means for moving one platen toward and from the other, said means comprising side arms carrying said platen and straddling said other platen and toggle mechanism connected to said side arms for moving the same, and for drawing said platen toward the other platen, said toggle mechanism comprising one link having a relatively fixed pivot and another link connected to said side arms for moving the same, said links being pivoted to each other providing a toggle knuckle, and means for extending and collapsing said toggle to move said side arms, said means being connected to one toggle link eccentrically of said knuckle whereby an increasing moment of force will be established by said means as the toggle collapses to swing said toggle link toward a fully collapsed condition.

8. A press of the class described, comprising relatively movable platens, and means for moving one platen toward and from the other, said means comprising a supporting device carrying said platen and toggle mechanism connected to said supporting device for moving the same, said toggle mechanism comprising one link having a relatively fixed pivot and another link connected to said supporting device for moving the same, said links being pivoted to each other providing a toggle knuckle, and means for extending and collapsing said toggle to move said supporting device, said means being connected to one toggle link eccentrically of said knuckle whereby an increasing moment of force will be established by said means as the toggle collapses to swing said toggle link toward a fully collapsed condition.

9. In an article-molding press comprising relatively movable press platens each carrying a mold section for mating with a mold section on the other platen, of means in each mold section for supplying a fluid under pressure between the mold surface and the article molded, means for relatively moving said platens to close and open the mold, and means associated therewith for controlling the supply of fluid under pressure to said mold sections and operatively connected to said mold opening and closing means to supply fluid under pressure to one mold section as the mold is being opened and thereafter to supply fluid under pressure to the other mold section upon continued opening movement of the mold sections to strip the article first from one mold section and then from the other.

10. In an article-molding press comprising relatively movable press platens each carrying a mold section for mating with a mold section on the other platen, of means in each mold section for supplying a fluid under pressure between the mold surface and the article molded, means for relatively moving said platens to close and open the mold, and means associated therewith for controlling the supply of fluid under pressure to said mold sections and operatively connected to said mold opening and closing means to supply fluid under pressure to one mold section as the mold is being opened and thereafter to supply fluid under pressure to the other mold section upon continued opening movement of the mold sections to strip the article first from one mold section and then from the other, said platens carrying upper and lower mold sections and said controlling means being operable first to strip the article from the lower mold section and thereafter to strip the article from the upper mold section.

11. A multiple press of the type described comprising a pair of molds arranged side by side, each mold comprising registering relatively movable mold sections, and means for relatively moving the mold sections of both molds in unison, said means comprisng a pair of side arms, one connected to each of said molds and a single intermediate arm between the molds and connected in common to both molds, said arms straddling the mold sections of the molds, and a prime mover connected to said arms for operating the same to open and close the molds.

CATO IVERSON.